(12) United States Patent
Shirk et al.

(10) Patent No.: US 6,168,193 B1
(45) Date of Patent: Jan. 2, 2001

(54) INFLATABLE CURTAIN WITH TENSIONING DEVICE

(75) Inventors: Bryan W. Shirk, Mesa; Jess A. Cuevas, Scottsdale; Ahmad K. Al-Amin, Higley; Timothy A. Swann; Roy D. Van Wynsberghe, both of Mesa, all of AZ (US)

(73) Assignee: TRW Inc., Lyndhurst, OH (US)

( * ) Notice: Under 35 U.S.C. 154(b), the term of this patent shall be extended for 0 days.

(21) Appl. No.: 09/368,652

(22) Filed: Aug. 5, 1999

(51) Int. Cl.$^7$ .................................................. B60R 21/22
(52) U.S. Cl. ..................... 280/730.2; 280/736; 280/749
(58) Field of Search ............................... 280/730.2, 749, 280/753, 736, 740

(56) References Cited

U.S. PATENT DOCUMENTS

| | | |
|---|---|---|
| 3,687,485 | 8/1972 | Campbell . |
| 5,265,903 | 11/1993 | Kuretake et al. . |
| 5,333,898 | 8/1994 | Stutz . |
| 5,462,308 | 10/1995 | Seki et al. . |
| 5,588,672 | 12/1996 | Karlow et al. . |
| 5,660,414 | 8/1997 | Karlow et al. . |
| 5,707,075 | 1/1998 | Kraft et al. . |
| 5,752,713 | * 5/1998 | Matsuura et al. ................. 280/730.2 |
| 5,788,270 | 8/1998 | Haland et al. . |
| 5,865,462 | 2/1999 | Robins et al. . |
| 5,924,722 | * 7/1999 | Kiode et al. ....................... 280/730.2 |

* cited by examiner

Primary Examiner—Peter C. English
(74) Attorney, Agent, or Firm—Tarolli, Sundheim, Covell, Tummino & Szabo L.L.P.

(57) ABSTRACT

An apparatus (10) for helping to protect an occupant of a vehicle (12) comprises a vehicle occupant protection device (14) which is inflatable away from a vehicle roof (28) into a position extending along a vehicle side structure (16) between the side structure and a vehicle occupant. An inflator (24) provides inflation fluid for inflating the vehicle occupant protection device (14). The inflation fluid rotates an impeller (180) which moves a tensioning member (154) in a linear direction. A flexible elongated member (54) has a first end (70) connected to the side structure (16) of the vehicle (12) and an opposite second end (72) connected to the tensioning member (154). The flexible elongated member (54) is connected to the vehicle occupant protection device (14). The flexible elongated member (54) is tensioned by the tensioning member (154) when the tensioning member moves in the linear direction. The flexible elongated member (54) resists movement of the vehicle occupant protection device (14) away from the side structure (16) of the vehicle (12) when the vehicle occupant protection device is inflated.

9 Claims, 3 Drawing Sheets

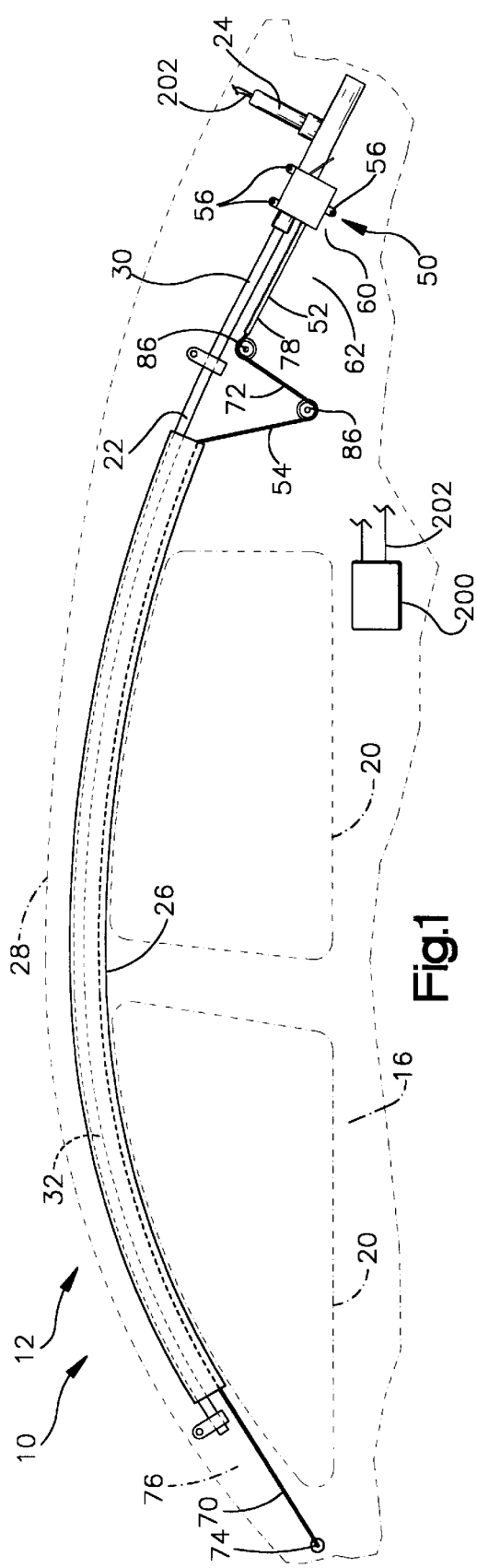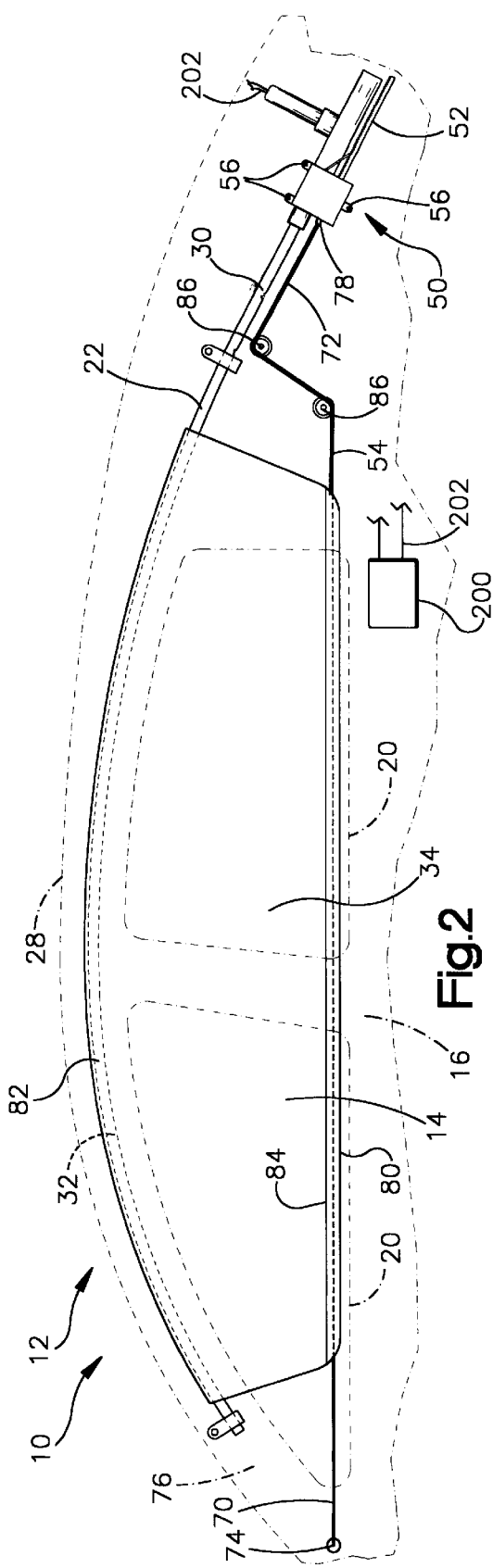

INFLATABLE CURTAIN WITH TENSIONING DEVICE

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle. The apparatus comprises a vehicle occupant protection device. The vehicle occupant protection device is inflatable away from a vehicle roof into a position extending along a vehicle side structure between the side structure and a vehicle occupant. An inflator provides inflation fluid for inflating the vehicle occupant protection device.

The inflation fluid rotates an impeller which moves a tensioning member in a linear direction. A flexible elongated member has a first end connected to the side structure of the vehicle and an opposite second end connected to the tensioning member. The flexible elongated member is connected to the vehicle occupant protection device between the first and second ends of the flexible elongated member. The flexible elongated member is tensioned by the tensioning member when the tensioning member moves in the linear direction. The flexible elongated member resists movement of the vehicle occupant protection device away from the side structure of the vehicle when the vehicle occupant protection device is inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus embodying the present invention in a deflated condition;

FIG. 2 is a schematic view of the vehicle safety apparatus of FIG. 1 in an inflated condition;

DESCRIPTION OF PREFERRED EMBODIMENTS

Figure 3:
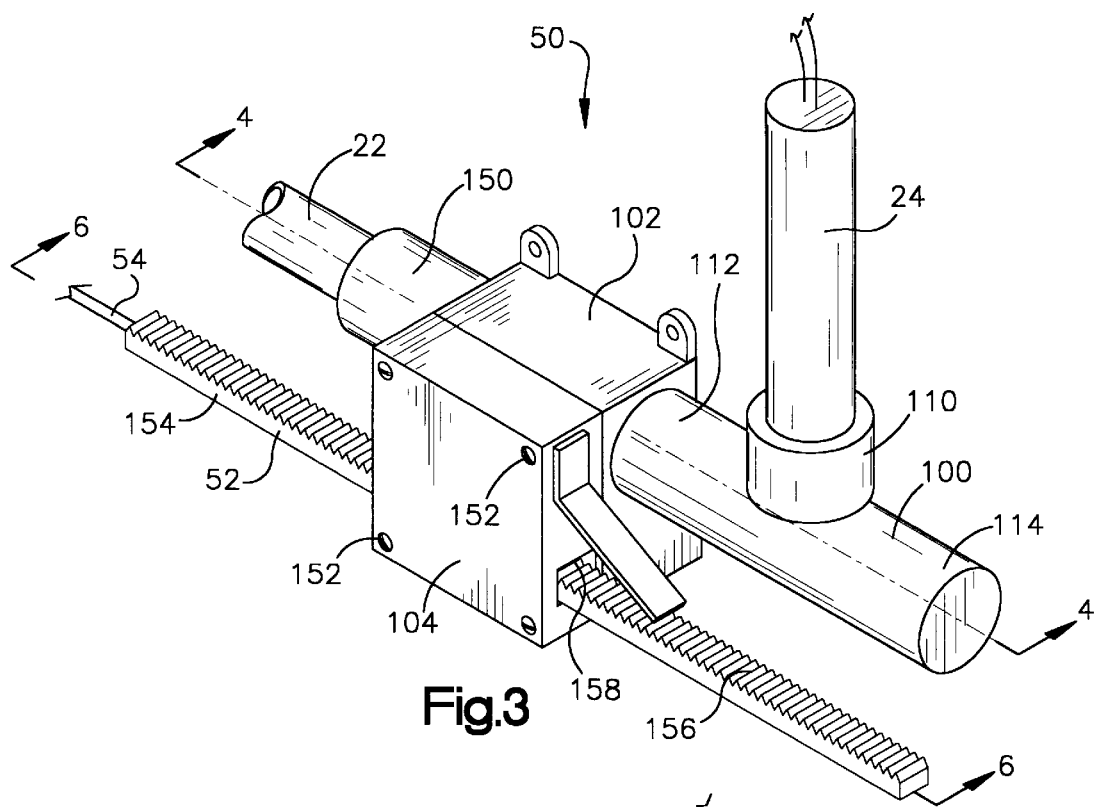
FIG. 3 is an enlarged perspective view of a portion of the vehicle safety apparatus of FIG. 1.

As representative of the present invention, an apparatus 10 for helping to protect an occupant of a vehicle includes a vehicle occupant protection device. As shown in FIGS. 1 and 2, a particular type of vehicle occupant protection device comprises an inflatable curtain 14 mounted adjacent to the side structure 16 of the vehicle 12. The side structure 16 of the vehicle 12 includes side windows 20. The inflatable curtain 14 is inflatable from a deflated condition (FIG. 1) to an inflated condition (FIG. 2). An inflator 24 (FIGS. 1 and 2) is connected in fluid communication with the inflatable curtain 14 through a fill tube 22.

The fill tube 22 has a first end portion 30 for receiving fluid from the inflator 24. The fill tube 22 has a second end portion 32 which is disposed in a main chamber 34 (FIG. 2) of the inflatable curtain 14. The second end portion 32 of the fill tube 22 has a plurality of openings (not shown) that provide fluid communication between the fill tube 22 and the main chamber 34 of the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 28 and along the side structure 16 of the vehicle 12 above the side windows 20.

As illustrated in FIGS. 1 and 2, the apparatus 10 includes a tensioning device 50. The tensioning device 50 is fixed to the side structure 16 of the vehicle 12 at a location designated 60 near or on a C pillar 62 of the vehicle 12. The tensioning device 50 may include fastener flanges 56 through which fasteners (not shown) are inserted in order to fasten the tensioning device 50 to the side structure 16 of the vehicle 12.

The tensioning device 50 includes a tensioning member 52 and a flexible elongated member 54. The flexible elongated member 54 comprises a cable, or the like, and has a first end 70 and an opposite second end 72. The first end 70 of the flexible elongated member 54 is fixedly connected to the side structure 16 of the vehicle 12 at a first location 74. The first location 74 is located near or on an A pillar 76 of the vehicle 12. The second end 72 of the flexible elongated member 54 is secured to an end 78 of the tensioning member 52. The flexible elongated member 54 is connected to the inflatable curtain 14 along a bottom edge 80 (FIG. 2) of the curtain 14. The bottom edge 80 is located opposite a top edge 82 of the inflatable curtain 14 which is positioned along the intersection of vehicle roof 28 and the side structure 16 of the vehicle 12. In the deflated condition of FIG. 1, the flexible elongated member 54 is stored in the housing 26 and extends along the vehicle roof 28 and side structure 16 of the vehicle 12 above the side windows 20.

In the illustrated embodiment, the flexible elongated member 54 extends from the first location 74 through a sleeve 84 formed along the bottom edge 80 of the inflatable curtain 14. Those skilled in the art will recognize, however, that the flexible elongated member 54 may be connected to the inflatable curtain 14 in an alternative fashion. For example, the flexible elongated member 54 could extend through loops or eyelets (not shown) arranged along the bottom edge 80 of the inflatable curtain 14.

In the illustrated embodiment, the flexible elongated member 54 (FIGS. 1 and 2) is guided from the inflatable curtain 14 to the tensioning member 52 by guides 86, such as pulleys. The guides 86 help to position the flexible elongated member 54 such that the member 54 extends through the sleeve 84 (FIG. 2) generally parallel to the bottom edge 80 of the inflatable curtain 14 when the curtain 14 is in the inflated condition. It will be recognized by those skilled in the art, however, that the guides 86 could be omitted and the tensioning device 50 positioned such that the flexible elongated member 54 would extend from the sleeve 84 directly to the tensioning member 52.

Figure 4:
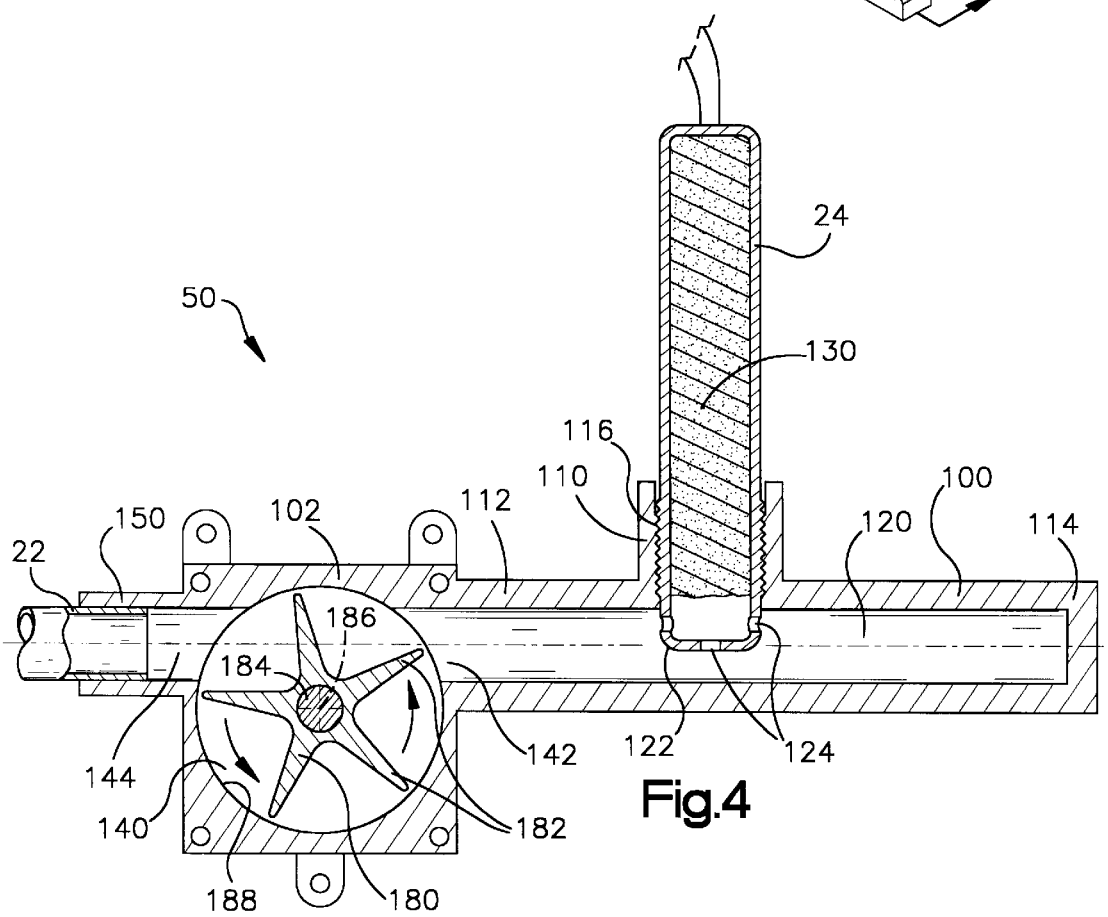
FIG. 4 is a sectional view of the vehicle safety apparatus of FIG. 3 taken along line 4—4 in FIG. 3.

As illustrated in FIG. 3, the tensioning device 50 also includes a gas tube 100, an impeller housing 102 and a rack block 104. Referring now to FIGS. 3 and 4, the gas tube 100 includes a fitting 110 located between first and second opposite ends 112 and 114 of the gas tube 100. The fitting 110 connects the inflator 24 to the gas tube 100. In the illustrated embodiment, the inflator 24 is arranged perpendicular to the gas tube 100 and is secured in the fitting 110 by threads 116. It will be recognized by those skilled in the art, however, that alternative constructions may also be suitable. For example, the inflator 24 may be connected to the second end 114 of the gas tube 100 in axial alignment with the tube 100.

As illustrated in FIG. 4, the interior of the gas tube 100 forms a gas plenum 120. The inflator 24 includes a nozzle 122 which is disposed in the plenum 120. The inflator nozzle 122 includes a plurality of apertures 124 which provide fluid communication between the inflator 24 and the gas plenum 120. A gas generating material 130 is disposed in the inflator 24. The material 130 is ignitable to generate inflation fluid.

It will be recognized by those skilled in the art that an alternative inflator could be used to provide inflation fluid. For example, the inflator 24 could contain a stored quantity of pressurized inflation fluid in the form of a gas. The inflator 24 also could contain a combination of pressurized inflation fluid and ignitable material for heating the inflation fluid.

As illustrated in FIG. 4, the impeller housing 102 includes a cylindrical impeller cavity 140, an inlet port 142, and an outlet port 144. The gas tube 100 extends from the inlet port 142 of the impeller housing 102. The inlet port 142 provides fluid communication between the gas plenum 120 and the impeller cavity 140. Thus, fluid communication is provided between the inflator 24 and the impeller cavity 140.

The impeller housing 102 also includes a fitting 150 that extends from the outlet port 144 of the housing 102. The fill tube 22 is connected to the fitting 150 by known means (not shown) such as threads, welding or an adhesive. The outlet port 144 provides fluid communication between the impeller cavity 140 and the fill tube 22.

Figure 5:
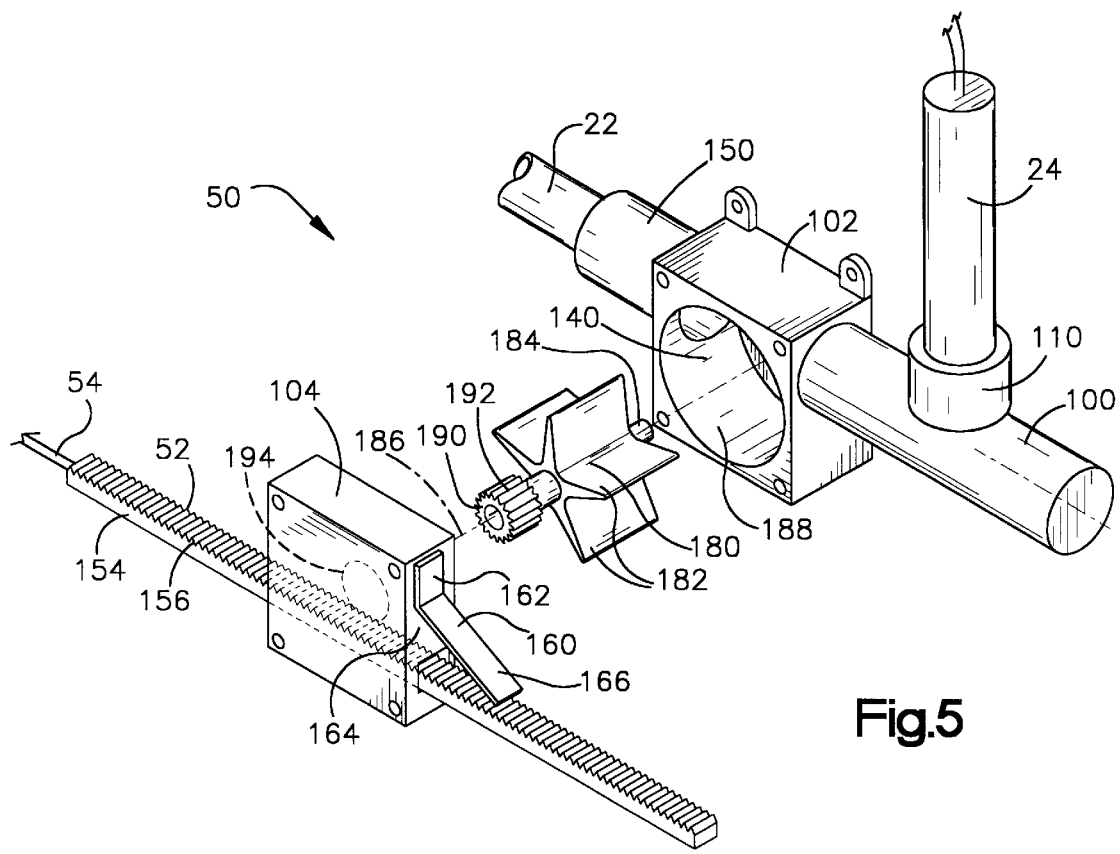
FIG. 5 is an exploded perspective view of the vehicle safety apparatus of FIG. 3.
Figure 6:
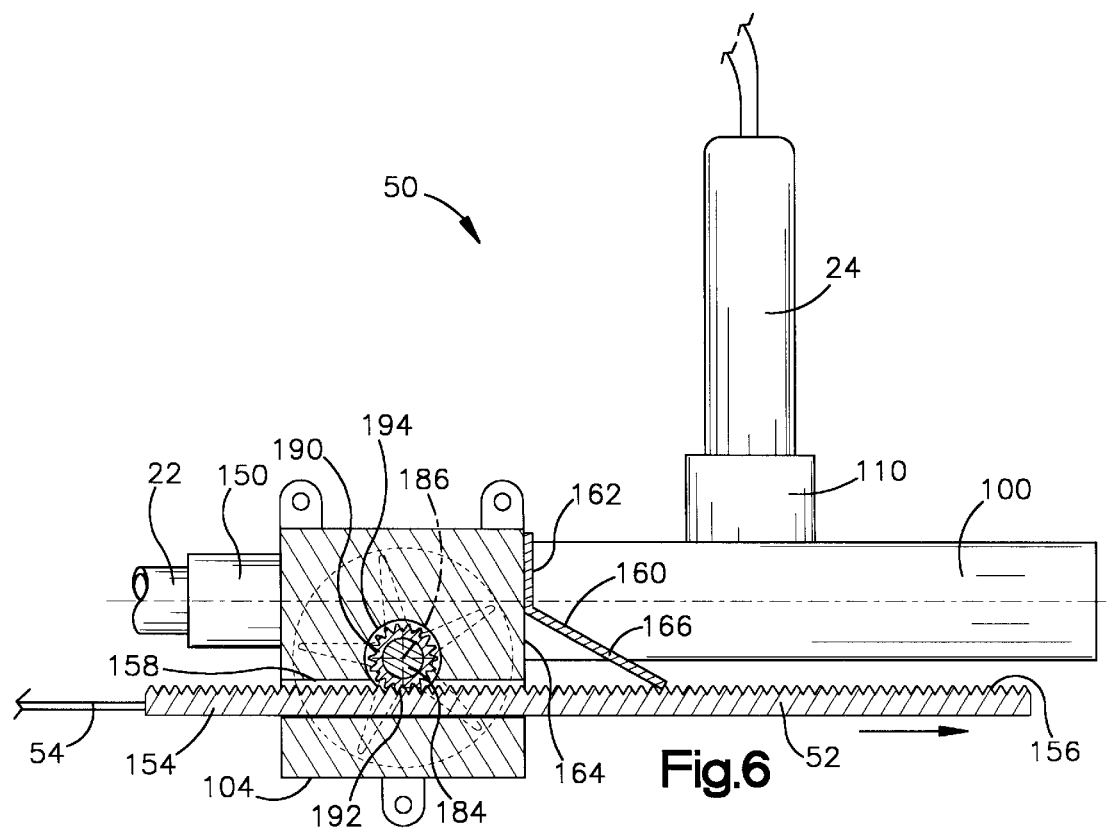
FIG. 6 is a sectional view of the vehicle safety apparatus of FIG. 3 taken along line 6—6 in FIG. 3.

The rack block 104 (FIG. 3) is connected to the impeller housing 102 and overlies the impeller cavity 140. The rack block 104 is fixed to the impeller housing 102 by fasteners 152 such as screws. Referring to FIGS. 5 and 6, the rack block 104 includes a rack slot 158 through which the tensioning member 52 extends. The tensioning member 52 comprises a rack 154. A series of rack teeth 156 are disposed along the rack 154. The rack 154 is movable within the rack slot 158 in a linear direction indicated by the arrow in FIG. 6.

A pawl 160 has a base 162 which is fixed to an outer surface 164 of the rack block 104 above the rack slot 158. The pawl 160 includes a pawl member 166 which extends in an angular direction from the base 164 towards the rack 154. The pawl member 166 is spring biased towards the rack 154 and engages the rack teeth 156. As the rack 154 is urged in the direction indicated by the arrow in FIG. 6, the rack teeth 156 function as a cam to displace the pawl member 166 against the spring bias. Thus, the pawl 160 permits the rack 154 to move in the direction indicated by the arrow in FIG. 6. When the rack 154 is urged in the direction opposite the arrow in FIG. 6, the pawl member 166 engages the rack teeth 156 and blocks the rack 154 from moving in the direction opposite the arrow in FIG. 6.

Referring now to FIGS. 4 and 5, the tensioning device 50 further includes an impeller 180 which is disposed in the impeller cavity 140. The impeller 180 includes impeller vanes 182 which extend radially from an impeller shaft 184. The impeller 180 is rotatable within the impeller cavity 140 about an axis 186. The impeller vanes 182 are of a length such that there is a close fit between the impeller 180 and the cylindrical side wall 188 of the impeller cavity 140. The impeller 180 may be supported by bearings (not shown) that facilitate the rotation of the impeller 180 about the axis 186 within the cavity 140.

Referring to FIGS. 5 and 6, the impeller 180 includes a pinion 190 that is fixed to the impeller shaft 184. The pinion 190 rotates with the impeller 180 about the axis 186. The pinion 190 includes a series of gear teeth 192 which extend radially outward from the pinion 190. When the tensioning device 50 is assembled (FIGS. 3 and 6), the impeller vanes 182 are located in the impeller cavity 140, and the pinion 190 protrudes from the cavity 140. The pinion 190 extends into a pinion aperture 194 (FIGS. 5 and 6) in the rack block 104. The pinion aperture 194 is in communication with the rack slot 158, and the gear teeth 192 of the pinion 190 engage with the rack teeth 156. As the pinion 190 rotates, the rack 154 is urged in a linear direction. Thus, the impeller 180, when rotated about the axis 186, moves the rack 154 in a linear direction as indicated by the arrow in FIG. 6.

The vehicle 12 includes a sensor device 200 (shown schematically in FIGS. 1 and 2) for sensing a side impact to the vehicle 12 and/or a rollover of the vehicle 12. The sensor device 200 actuates the inflator 24 in response to the sensing of a side impact or a vehicle rollover.

In the event of a rollover of the vehicle or a side impact to the vehicle 12 of a magnitude greater than a predetermined threshold value, the sensor device 200 provides an electrical signal over lead wires 202 to the inflator 24. The electrical signal actuates the inflator 24 by igniting the gas-generating material 130 (FIG. 4) in a known manner. The ignited material 130 generates inflation fluid (not shown) which is discharged under pressure through the apertures 124 in the nozzle 122 and into the gas tube 100. The gas tube 100 directs the fluid through the inlet port 142 into the impeller cavity 140. The fluid passes through the cavity 140, exiting through the outlet port 144 and entering the fill tube 22. The fill tube 22 directs the fluid into the main chamber 34 of the inflatable curtain 14.

The inflatable curtain 14 (FIG. 2) inflates under the pressure of the inflation fluid from the inflator 24. The housing 26 opens and the inflatable curtain 14 inflates away from the roof 28 in a downward direction as shown in the drawings and in a downward direction with respect to the direction of forward travel of the vehicle 12. The curtain 14, when inflated, extends fore and aft in the vehicle 12 along the side structure 16 of the vehicle 12 and is positioned between the side structure 16 of the vehicle 12 and any occupant of the vehicle 12.

When the inflator 24 is actuated, the inflation fluid inflates the inflatable curtain 14 while simultaneously actuating the tensioning device 50. As the pressurized inflation fluid passes through the impeller cavity 140 (FIG. 4), the fluid strikes the impeller vanes 182 and causes the impeller 180 to rotate in the direction indicated by the arrows in FIG. 4. The pinion 190 (FIG. 6) rotates along with the impeller vanes 182, which causes the tensioning member 52 to move in the linear direction indicated by the arrow in FIG. 6.

The tensioning member 52 moves in the linear direction from a first position when the inflatable curtain 14 is in the deflated condition (FIG. 1) to a second position when the curtain 14 is in the inflated condition (FIG. 2). As the curtain 14 inflates along the side structure 16 of the vehicle 12, the tensioning member 52 pulls upon and applies a tension to the flexible elongated member 54.

In the inflated condition (FIG. 2), the tensioned flexible elongated member 54 resists movement of the inflatable curtain 14 away from the side structure 16 of the vehicle 12. Thus, the flexible elongated member 54 helps maintain the position of the inflated curtain 14 between any occupant of the vehicle 12 and the side structure 16 of the vehicle 12.

As the inflated curtain 14 deflates, the pawl 160 (FIG. 6) maintains the tensioning member 52 in the second position illustrated in FIG. 2 and blocks the tensioning member from moving in a direction opposite the linear direction indicated by the arrow in FIG. 6. The position of the curtain 14 is thus maintained by the tensioning device 50.

When the curtain 14 is fully deflated, the flexible elongated member 54 remains extending through the sleeve 84 and acts to hold the curtain 14 in position. Thus, the tensioning device 50 helps maintain the position of the curtain 14 between any occupant of the vehicle 12 and the side structure 16 of the vehicle 12 throughout the duration of the vehicle collision and/or rollover.

Those skilled in the art will recognize that it may be desirable to apply a tension to the inflatable curtain 14 in the downward direction in which the curtain 14 is inflated. In this instance, the first location 74 and at least one of the guides 86 may be positioned below the bottom edge 80 of the inflated inflatable curtain 14. As a result, when the inflatable curtain 14 is inflated, the flexible elongated member 54 would tension the curtain 14 in a downward direction as viewed in the drawings and in a downward direction with respect to the direction of forward travel of the vehicle 12.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle which has a side structure and a roof, said apparatus comprising:

a vehicle occupant protection device which is inflatable away from the vehicle roof into a position between the side structure of the vehicle and a vehicle occupant, said vehicle occupant protection device when inflated extending along the side structure of the vehicle;

an inflator for providing inflation fluid for inflating said vehicle occupant protection device;

a tensioning member which is movable in a linear direction;

an impeller rotatable by said inflation fluid about an axis to move said tensioning member in said linear direction; and a flexible elongated member having a first end connected to the side structure of the vehicle at a first location and an opposite second end connected to said tensioning member, said flexible elongated member being connected to said vehicle occupant protection device;

said flexible elongated member being tensioned by said tensioning member when said tensioning member moves in said linear direction, said flexible elongated member resisting movement of said vehicle occupant protection device away from the side structure of the vehicle when said vehicle occupant protection device is inflated.

2. Apparatus as defined in claim 1, wherein said tensioning member moves in said linear direction from a first position when said vehicle occupant protection device is uninflated to a second position when said vehicle occupant protection device is inflated, said tensioning member being held in said second position and prevented from moving in a direction opposite said linear direction.

3. Apparatus as defined in claim 1, further including an impeller housing having an impeller cavity, said impeller being disposed in said impeller cavity, said inflator being in fluid communication with said impeller cavity, said inflator providing inflation fluid to rotate said impeller and move said tensioning member in said linear direction.

4. Apparatus as defined in claim 1, wherein said tensioning member comprises an elongated rack that includes a series of rack teeth arranged along said rack, said impeller including a pinion which rotates with said impeller, said pinion including gear teeth which engage said rack teeth to move said rack in said linear direction when said pinion rotates.

5. Apparatus as defined in claim 4, further including a pawl which engages said rack teeth to prevent said rack from moving in a direction opposite said linear direction.

6. Apparatus as defined in claim 1, wherein said vehicle occupant protection device is an inflatable curtain having a stored position extending along the side structure adjacent the vehicle roof, said inflatable curtain having a top edge positioned adjacent to the vehicle roof and an opposite bottom edge, said flexible elongated member being connected to said inflatable curtain along said bottom edge of said inflatable curtain.

7. Apparatus as defined in claim 6, wherein said flexible elongated member extends through a sleeve located along said bottom edge of said inflatable curtain.

8. Apparatus as defined in claim 6, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

9. Apparatus as defined in claim 8, further including a sensor for sensing a vehicle condition for which inflation of said side curtain is desired, said sensor actuating said inflator to provide inflation fluid to said fill tube and said impeller.

* * * * *